Dec. 15, 1959  A. F. STANSELL  2,917,231
ADVANCING-RETRACTING MEANS FOR CALCULATING MACHINE PIN CARRIAGE
Filed May 14, 1956  3 Sheets-Sheet 1
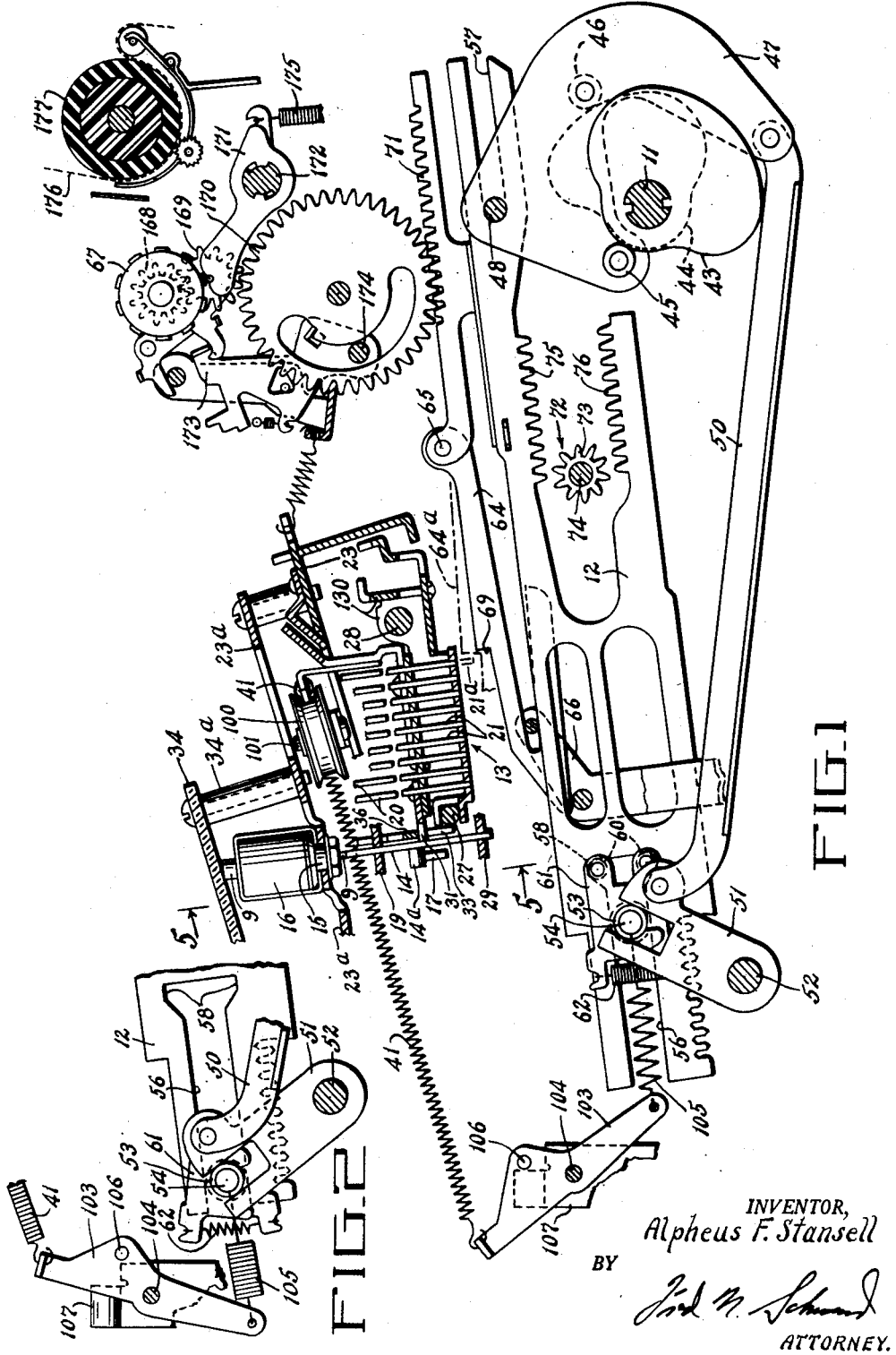
INVENTOR,
Alpheus F. Stansell
BY
ATTORNEY.

Dec. 15, 1959 A. F. STANSELL 2,917,231
ADVANCING-RETRACTING MEANS FOR CALCULATING MACHINE PIN CARRIAGE
Filed May 14, 1956 3 Sheets-Sheet 2

INVENTOR,
Alpheus F. Stansell
BY
ATTORNEY.

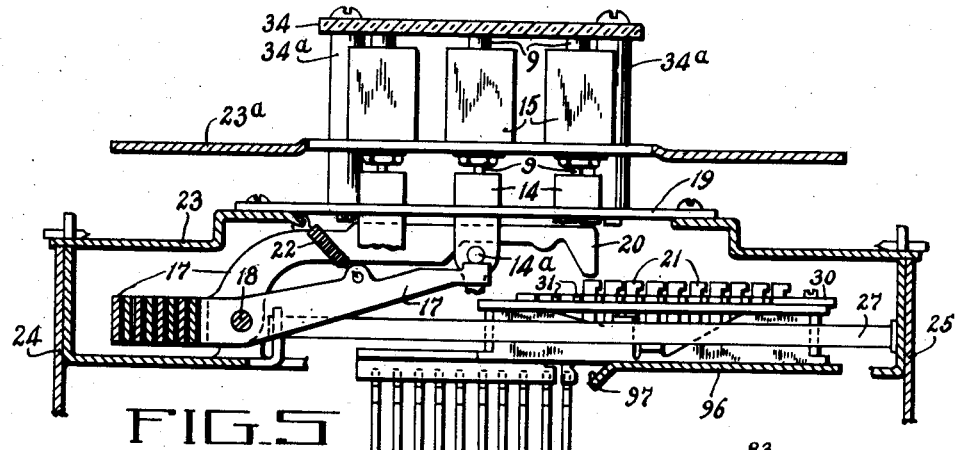
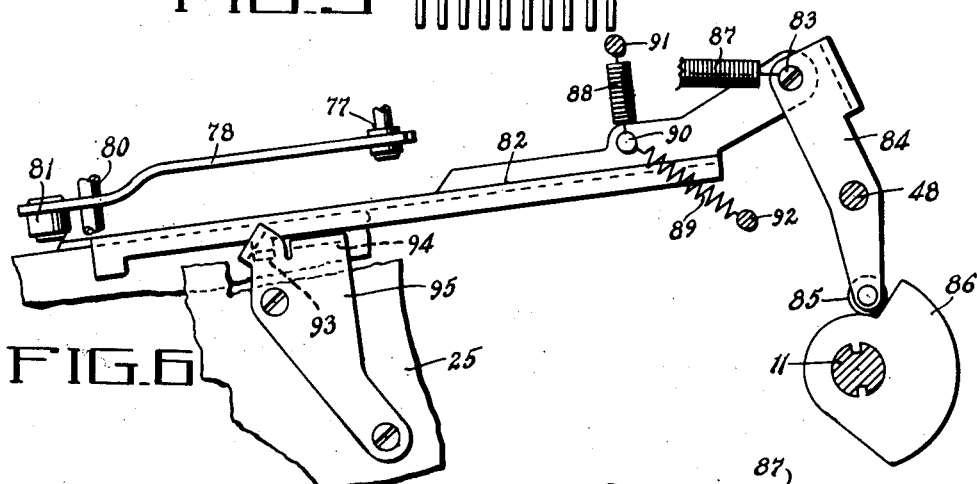
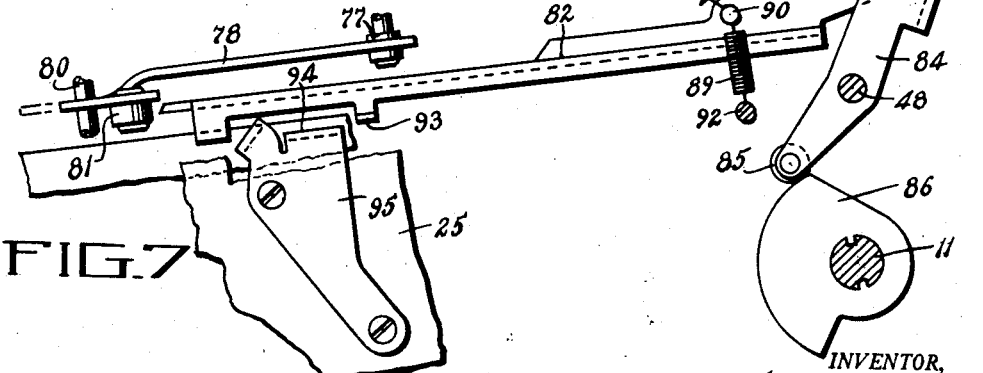

United States Patent Office 2,917,231
Patented Dec. 15, 1959

2,917,231

ADVANCING-RETRACTING MEANS FOR CALCULATING MACHINE PIN CARRIAGE

Alpheus F. Stansell, Puente, Calif., assignor to Clary Corporation, San Gabriel, Calif., a corporation of California Application May 14, 1956, Serial No. 584,656

3 Claims. (Cl. 235—60)

This invention relates to calculating machines and has particular reference to machines of the ten key type having ten amount keys in which the various digits of a factor are serially entered.

Such machines generally incorporate a stop or pin carriage on which are mounted a field of settable actuator stops. The carriage is spring advanced in one direction under the amount keys or key controlled setting elements so that upon depression of each key and consequent setting of an associated stop, the carriage is advanced one increment preparatory to setting of a new stop by the next depressed amount key.

As an incident to each machine cycle, the carriage is returned, usually by spring or motor power to an initial position ready to receive entry of the next factor or amount.

Under ordinary conditions and when amounts are manually entered, the above mechanism is normally satisfactory. However, when such keys are operated by power devices such as solenoids under control of electronic computers, counters or the like at relatively high speeds on the order of, say, 20 to 40 digit entries per second, problems in operation arise due, at least in part, to lagging of the carriage as it advances relative to the amount keys.

Increasing the tension of the carriage advancing spring sufficient to cause the carriage to advance at proper speeds tends to unduly load the carriage return mechanism which must subsequently operate against the load imposed by the advancing spring. This not only throws an undue load on the motor drive for the machine, but also tends to twist or warp the machine parts and/or frame with consequent malfunctioning of the machine as a whole. This problem is further aggravated when a carriage return spring is utilized to return the carriage to its initial position against the action of the advancing spring.

It therefore becomes a principal object of the present invention to overcome the above difficulties in a machine of the aforementioned type in which amounts are entered at a relatively high speed.

Another object of the invention is to increase the speed of advancement of a pin carriage while reducing the load upon the drive instrumentalities for returning the carriage.

The above objects are accomplished in general by relaxing the pin carriage advancing spring during return of the pin carriage to its initial position and for thereafter tensioning the spring before completion of the machine operation.

The manner in which the above and other objects of the invention are accomplished will be readily understood on reference to the following specification when read in conjunction with the accompanying drawings, wherein:

Fig. 1 is a longitudinal sectional view through a ten key type adding-listing machine embodying a preferred form of the present invention.

Fig. 2 is a fragmentary view of part of the mechanism shown in Fig. 1, illustrating the same in a mid-cycle position.

Fig. 5 is a transverse sectional view taken substantially along the line 5—5 of Fig. 1.

Fig. 6 is a sectional view illustrating the pin carriage return mechanism in full cycle position.

Fig. 7 is a sectional view similar to Fig. 6 but illustrating the carriage return mechanism at a mid point in the machine cycle.

Figure 4:
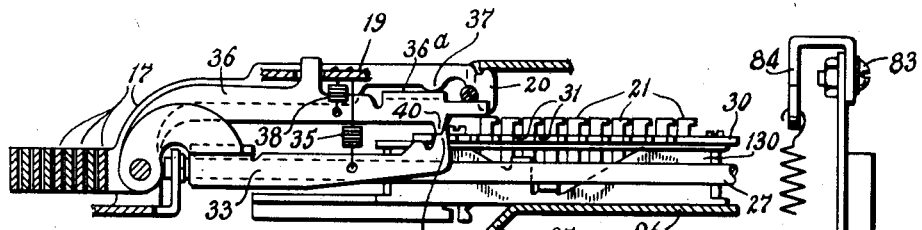
Fig. 4 is a transverse sectional view illustrating the escapement mechanism.

Reference is hereby made to the R. E. Boyden, et al. pending patent application, Serial No. 506,486, filed on May 6, 1955, and to the R. E. Boyden Patent No. 2,583,810, issued on January 29, 1952 for a complete disclosure of a ten key type adding-listing machine in which the present invention is embodied. Therefore, for the sake of brevity, only those portions of the machine which embody the present invention or which cooperate directly therewith will be illustrated and described herein.

The machine in which the present invention is embodied is driven by a motor (not shown) which is effective during each cycle to rotate a drive shaft 11 one complete revolution in a counterclockwise direction.

The machine in general comprises a plurality of reciprocable drive racks, one of which is shown at 12, differentially operable under control of a pin carriage, generally indicated at 13, whose stop pins 21 are set in a serial manner by depressing selected ones of ten amount keys 14. The latter are slideably mounted in keyboard frame bars 19 and 29. In this case, the usual manually depressible key tops have been removed and in their stead the keys are depressed by solenoids, one of which is indicated at 15. The latter comprises a solenoid coil 16 suitably secured to an auxiliary keyboard top frame plate 23a and cooperating with a slideable armature pin 9 which directly overlies the associated key 14.

When any solenoid coil 15 is energized it will become effective to cause its pin 9 to force the respective key 14 downwardly to thereby rock a respective one of a series of bails 17 whose arms directly underlie pins or projections 14a on the keys (see Fig. 5).

The various bails 17 are nested together and are pivotally mounted independently of each other on a cross rod 18 suitably supported in the frame work of the machine. Opposite legs of the various bails 17 terminate in aligned hammer projections 20 which are located over respective ones of a row of stop pins 21 carried in the pin carriage 13.

Each of the various bails 17 and its corresponding key 14 is normally held in its illustrated position by a spring 22 extending between the bail and the keyboard top plate 23, the latter being suitably secured to machine side frames 24 and 25. In this position, the upper end of the respective solenoid armature pin 9 is held against the undersurface of a plastic retainer plate 34 which is supported in spaced relation to the keyboard plate 23a by posts 34a.

Upon energization of any of the solenoids, the respective pin 9 will be forced downwardly causing its key to rock the associated bail 17 and thus depress an aligned stop pin 21 from its position shown in Fig. 5 to a lower position indicated by the dot and dash lines 21a (Fig. 1). In this position the pin will subsequently be effective to arrest a rack 12 in a corresponding numerical position.

The pin carriage 13 comprises a box frame 130, the top and bottom walls of which are provided with a field of coordinately aligned slots in which are slideably mounted the stop pins 21. Suitable means (not shown) are provided to yieldably detent the stop pins in their upper and lower positions.

The pin carriage is movable laterally of the machine into cooperative relation with different ones of the racks 12. For this purpose, the pin carriage is slideable along two spaced rods 27 and 28 carried by the machine frame.

An escapement mechanism is provided to cause the machine to be stepped laterally (to the left in Figs. 3, 4 and 5) from one denominational order to the next as an incident to energization of any solenoid 16 and consequent setting of the corresponding stop pin 21.

Figure 3:
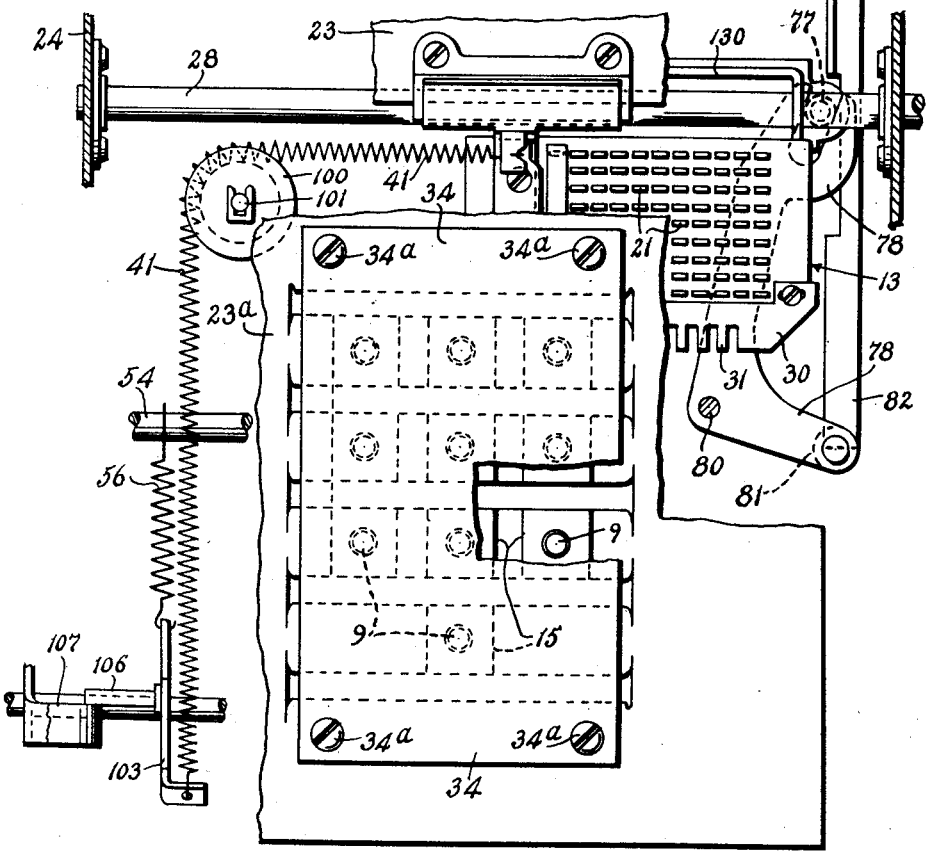
Fig. 3 is a plan view, with parts broken away, of part of the machine, particularly the keyboard and pin carriage.

As shown in Figs. 3 and 4, a toothed plate 30 is carried by the pin carriage 13 and has a series of forwardly extending teeth 31 engageable by a tooth 32 of an escapement lever 33. The latter is pivoted on the rod 18 and is urged upwardly into engagement with the teeth 31 by a spring 35 tensioned between the lever and a part of the keyboard plate 23. A bail 36, also pivoted on the rod 18 is provided with a web portion 36a underlying humps 37 formed on the various bails 17. A spring 38 tensioned between the bail 36 and a bar 19 normally holds the bail in its upper illustrated position.

As any amount key 14 is depressed, and the hammer portion 20 of its associated bail depresses the corresponding pin 21 in the pin carriage, the escapement bail 36 will be brought downward, causing a tooth 40 thereon to depress and disengage the tooth 32 of the escapement lever from engagement with the adjacent one of the teeth 31. Accordingly, a spring 41 which is tensioned at this time, as will be described in further detail hereinafter, will be effective to advance the pin carriage to the left a slight amount. When the depressed key is allowed to rise the spring 38 will be effective to return the escapement bail 36 upward to its original position allowing the pin carriage to continue its advance whereupon the spring 35 will raise the escapement lever 33 back into blocking position.

Means are provided for yieldably advancing the racks 12 (to the left in Fig. 1) and thereafter returning the same during each cycle. For this purpose, a pair of juxtaposed complementary cams 43 and 44 are keyed on the shaft 11 and are engaged by rollers 45 and 46, respectively, mounted on a cam follower 47. The latter is pivoted on a cross support rod 48 and is connected by a link 50 to a bifurcated arm 51. The arm is fastened to a rock shaft 52 and its bifurcation embraces a roller 53 rotatably mounted on one end of a rack drive shaft 54. This shaft is guided for fore and aft movement in a direction transverse through its axis by suitable guide means (not shown) provided in the machine frame. A similar roller, not shown, is provided on the opposite end of the shaft 54 and is embraced by an arm similar to arm 51 and fixed to the shaft 52 to insure parallel movement of the shaft during its rack drive movement by the cams 43 and 44.

Each of the racks 12 has an elongated slot 56 which slideably embraces the drive shaft 54 whereby to support the forward ends of the racks, the opposite ends of the racks having guide slots 57 slideably embracing the support rod 48.

The slot 56 in each rack terminates in opposed lateral notches 58 each of which is engaged by a roller 60 carried on a drive element 61 which is pivotally supported on the shaft 54. The two drive elements associated with any one rack are spring urged in opposite directions about the shaft 54 by a tension spring 62 so as to yieldably advance the rack.

At the start of a machine cycle, rack stop slides 64, pivoted at 65 to extensions of the various racks, are raised by a bail 66 into upper positions indicated by the dot-dash lines 64a. In these positions, stop shoulders 69 on the stop slides are located in positions to be blocked by depressed ones of the stop pins 21 carried by the pin carriage. Thus, during the forward advancement of the racks 12, and when the stop slide 64 of any rack is arrested by a depressed stop pin, the drive rollers 60 will ride out of the notches 58 against the action of spring 62, thus breaking the connection between the shaft and the rack whereupon the rollers will ride along the edges of the slot 56.

Each rack is effective during advancement thereon to set a respective printing dial 67, preparatory to a printing operation, through a train of gears 168, 169 and 170. The latter meshes with a rack gear section 71 formed on an extension of the associated rack. The dials 67 are carried by arms 171 mounted on a printer shaft 172. In mid cycle, latches 173 are rocked about a pivot rod 174 and the arms are permitted to swing clockwise under the action of respective springs 175 to effect printing against a paper tape 176 supported by a platen 177.

The racks are also effective to digitize and total an accumulator generally indicated at 72, the latter comprising individual gears 73 rotatably mounted on an accumulator shaft 74 which is raised to mesh the gears 73 with upper gear rack sections 75 during additive operations and to lower the gears into mesh with lower rack gear sections 76 during subtractive operations.

The pin carriage is returned to its home position shown in Figs. 3 and 5 during the latter half of most machine cycles, and during this return movement all depressed stop pins 21 are raised to their initial positions, shown in Fig. 5. As will be noted on reference to the timing chart in Fig. 8, the pin carriage is returned between approximately 200° to 250° of the cycle so that new amounts may be entered into the amount keys before the machine has completed its current cycle.

For this purpose, the pin carriage has a stud 77, Fig. 3, extending downwardly therefrom and embraced by a bifurcated bell crank 78. The latter is pivotally supported at 80 and carries a roller 81 arranged to be engaged by the forwardly extending end of a reciprocating link 82, Figs. 6 and 7. The link 82 is pivoted at 83 to a cam follower 84. The latter is pivoted on the support rod 48 and carries a roller 85 which engages the periphery of a pin carriage return cam 86 keyed on the drive shaft 11. A relatively strong spring 87 is tensioned between the cam follower 84 and a suitable part (not shown) of the keyboard frame, urging the link 82 in a forward direction.

A pair of oppositely extending springs 88 and 89 are connected at their adjacent ends to a pin 90 on the link 82 and at their opposite ends to respective frame pins 91 and 92. The link 82 is provided with a laterally extending ear 93 which is arranged to be guided under and over a ledge 94 formed on a bracket 95 attached to the right hand machine side frame 25.

The arrangement of the springs 88 and 89 and their respective anchoring pins 91 and 92 is such that when the link 82 is in its normal forward position shown in Fig. 6, the spring 89 will be extended a greater amount than spring 88 and will accordingly bias the link 82 downwardly into its position shown wherein the ear 93 is located under the plane of the ledge 94. In this position, the forward edge of the link 82 will be located below the roller 81. Accordingly, during an ensuing machine cycle, and as the link 82 is drawn rearwardly by the action of the cam 86, the ear 93 will ride along the undersurface of the ledge 94. As the link approaches its rearmost position as shown in Fig. 7, the stud 90 will move to a position closer to the stud 92 and, therefore, the condition of the springs 88 and 89 will be reversed, the spring 88 being tensioned a greater amount to thereby bias the link 82 upwardly. As the link moves into its rearmost position, the ear 93 will pass beyond and from beneath the ledge 94, thereby permitting the spring 88 to snap the link to its upper position shown in Fig. 6. The forward end of the link 82 will now be located directly in line with the roller 81 of the pin carriage return bell crank so that as the spring 87 is allowed to advance the link at approximately 200° in the cycle (Fig. 8) in following the cam 86 it will pick up the roller 81 and thus return the pin carriage to its home position shown in Fig. 3. During this movement, the ear 93 will ride on the upper surface of the guide ledge 94 until shortly before the forward extremity of its travel is reached whereupon the condition of the springs 88 and 89 will again have reversed. Thus, as the ear 93 passes the guide ledge at approximately 250°, it will again drop to its position shown in Fig. 6, leaving the pin carriage in its home position.

Referring to Fig. 5, the stop pins 21 are returned to their raised positions during return of the pin carriage by the link 82 and for this purpose a stationary cam plate 96 is provided. The cam plate has a deflecting portion 97 against which depressed ones of the stop pins engage, the pins being deflected upward as the pin carriage moves over such deflecting portion.

In accordance with the present invention, the pin carriage advancing spring 41 is tensioned toward the end of a machine cycle and remains so after completion of the cycle in order to permit rapid movement of the pin carriage (to the left in Fig. 3) in response to rapid actuation of the various keys by the solenoids 16.

For this purpose, the spring 41 is suitably attached at one end thereof to a part of the pin carriage and is guided around a pulley 100 rotatably supported on a frame pin 101, and attached at its opposite end to the upper end of a lever 103. (Figs. 1 and 2.) The latter is pivotally supported at 104. A spring 105 is extended between the lower end of the lever 103 and the rack drive shaft 54. The spring 105 is relatively heavier than the spring 41 but weaker than the carriage return spring 87.

Normally, when the machine is in its full cycle position shown in Fig. 1, the spring 105 is tensioned slightly holding a stud 106 on the lever 103 against a stop shoulder formed on a bracket 107 suitably supported by the machine frame. In this condition, the spring 41 is tensioned to its fullest extent exerting a strong leftward pull on the pin carriage and enabling the latter to rapidly advance in response to energization of any solenoid 16. This pull will exist throughout the entire leftward travel of the pin carriage. During this time it will be recalled that the pin carriage return link 82 (Figs. 6 and 7) is completely divorced from the pin carriage and therefore offers no resistance or drag to its forward advancement.

Figure 8:
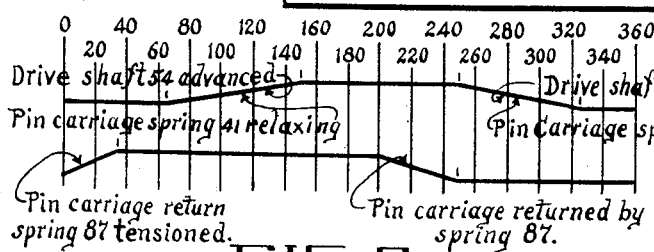
Fig. 8 is a timing chart.

Referring to Fig. 8, it will be noted that, during a machine cycle, the rack drive shaft 54 is advanced during the period between approximately 65° and 145°, thereby relaxing the spring 41 to almost but not completely collapsed position.

During an ensuing portion of the cycle, from 200° to 250°, and while the spring 41 is so relaxed, the pin carriage return cam 86 enables the much heavier spring 87 to advance the carriage return link 82 to thereby return the pin carriage back to its initial position. The spring 41 will, during this movement, be partially tensioned but since it is much weaker than the spring 87, it will have no effect on the latter. Thereafter, and between approximately 250° and 325°, the rack drive shaft 54 is returned from its advanced position shown in Fig. 2 to its initial position (Fig. 1) thereby completely tensioning the spring 41 preparatory to entry of a new amount.

As disclosed in the aforementioned Boyden et al. patent application, the rack stop slides 64 are lowered to their full line positions of Fig. 1, out of cooperative relation with the stop pins 21, at approximately 200°. Therefore, as soon as the pin carriage has been completely returned to its initial position, at 250°, and all previously depressed stop pins have accordingly been raised, the solenoids 16 may then be energized to successively enter the digits of a new amount preparatory to a new cycle even though the machine is continuing through an appreciable portion of its current cycle. That is, at 250° the spring 41 will be sufficiently tensioned to enable rapid advancement of the pin carriage in response to energization of a solenoid 16 before the lever 103 is rocked counterclockwise from its position shown in Fig. 2.

Although I have described my invention in detail and have therefore used certain specific terms and languages herein, it is to be understood that the present disclosure is illustrative rather than restrictive, particularly in regard to the make and type of machine to which it is applied, and that changes and modifications may be made without departing from the spirit or scope of the invention.

Having thus, described the invention, what I desire to secure by United States Letters Patent is:

1. In a calculating machine having differentially movable actuators, cyclically operable drive mechanism for said actuators, a plurality of amount keys, a pin carriage having actuator stop elements settable into actuator stopping positions in response to actuation of respective ones of said keys, means including an oscillatable member and a normally tensioned spring intermediate said member and said pin carriage for advancing said pin carriage laterally relative to said actuators and from an initial position; and an escapement device for said pin carriage operable in response to actuation of any of said keys; means controlled by said drive mechanism upon operation thereof for first moving said member to at least substantially relax said advancing spring, and means other than said first mentioned means and controlled by said drive mechanism for thereafter returning said pin carriage to said initial position, said first mentioned means being controlled by said drive mechanism to thereafter move said member to tension said advancing spring.

2. In a calculating machine having differentially movable actuators, cyclically operable drive mechanism for said actuators, a plurality of amount keys, a pin carriage having actuator stop elements settable into actuator stopping positions in response to depression of respective ones of said keys, means including an oscillatable member and a spring intermediate said member and said pin carriage for advancing said pin carriage laterally relative to said actuators and from an initial position; and an escapement device for said pin carriage operable in response to depression of any of said keys; means controlled by said drive mechanism upon operation thereof for first moving said member to at least substantially relax said advancing spring and for thereafter moving said member to tension said spring, and means other than said first mentioned means and controlled by said drive mechanism for returning said pin carriage to said initial position while said advancing spring is relaxed, said first mentioned means maintaining said advancing spring tensioned after a cycle of operation thereof and before a subsequent cycle of operation thereof.

3. In a calculating machine having differentially movable actuators, cyclically operable drive mechanism for said actuators, a plurality of amount keys, a pin carriage having actuator stop elements settable into actuator stopping positions in response to actuation of respective ones of said keys, an advancing spring attached at one end thereof to said pin carriage for advancing said pin carriage laterally relative to said actuators and from an initial position, and an escapement device for said pin carriage operable in response to actuation of any of said keys; a spring tensioning device attached to the opposite end of said spring, means controlled by said drive mechanism upon operation thereof for causing said tensioning device to first at least substantially relax said spring and to thereafter tension said spring, and means controlled by said drive mechanism for returning said pin carriage to said initial position while said spring is at least substantially relaxed.

References Cited in the file of this patent
FOREIGN PATENTS 620,175     Great Britain _____ Mar. 21, 1949